United States Patent [19]

Hun

[11] Patent Number: 4,932,697
[45] Date of Patent: Jun. 12, 1990

[54] BRAKE ACTUATED AUTOMATIC EXTENDING BUMPER

[76] Inventor: Yang C. Hun, No. 15, Lane 59, Nehu Rd. Sec. 3, Taipei, Taiwan

[21] Appl. No.: 291,781

[22] Filed: Dec. 29, 1988

[51] Int. Cl.$^5$ ............................................. B60R 19/02
[52] U.S. Cl. ........................................... 293/5; 293/30; 293/134
[58] Field of Search ............... 293/104, 118, 132, 134, 293/5, 6, 30; 267/116, 139, 64.15

[56] References Cited

U.S. PATENT DOCUMENTS

| | | | |
|---|---|---|---|
| 2,977,146 | 3/1961 | Edwards et al. | 293/134 |
| 3,210,063 | 10/1965 | Kirsch | 267/64.15 X |
| 3,346,292 | 10/1967 | Lundman | 293/118 X |
| 3,355,208 | 11/1967 | Brock | 293/118 X |
| 3,834,686 | 9/1974 | Moritz et al. | 293/134 X |
| 3,947,061 | 3/1976 | Ellis | 293/134 X |
| 3,993,294 | 11/1976 | Wössner et al. | 267/64.15 |
| 4,061,320 | 12/1977 | Warner | 267/64.15 |
| 4,474,257 | 10/1984 | Lee | 293/118 X |
| 4,518,183 | 5/1985 | Lee | 293/134 X |
| 4,546,959 | 10/1985 | Tanno | 267/64.15 |

FOREIGN PATENT DOCUMENTS 2243076 3/1974 Fed. Rep. of Germany ...... 293/134

Primary Examiner—Johnny D. Cherry
Assistant Examiner—Gary C. Hoge
Attorney, Agent, or Firm—Fleit, Jacobson, Cohn, Price, Holman & Stern

[57] ABSTRACT

A shock absorbing system for an automotive vehicle having a chassis and front and rear bumpers which are movable relative to the chassis is provided. The system comprises an hydraulic oil circuit which includes a storage tank for storing hydraulic oil, a pump for pumping hydraulic oil from the tank into the circuit and an electric motor for driving the pump. An actuator for extending or retracting the front and rear bumpers away or toward the chassis is provided downstream of the pump and comprises an upper oil chamber and a lower oil chamber, the arrangement being such that when a predetermined oil pressure is maintained in the upper chamber, the bumpers are maintained in a retracted position relative to the chassis and when the pressure is switched to the lower oil chamber, the bumpers are moved to positions in which they are extended from the chassis. A solenoid valve is provided for alternately connecting either the upper oil chamber or the lower oil chamber of the actuator to the hydraulic oil flow downstream of the pump. Switching means is provided for activating the solenoid valve. An accumulator for absorbing the pressure shock imported to the front or rear bumper due to a collision of the vehicle with another vehicle or object is included in the system. The accumulator comprises a cylinder and a piston in the cylinder dividing the cylinder into an oil chamber, which is connected to the hydraulic return line, and a gas chamber which is connected to a source of pressurized gas for cushioning the shock of a collision.

9 Claims, 5 Drawing Sheets

4,932,697

BRAKE ACTUATED AUTOMATIC EXTENDING BUMPER

BACKGROUND OF THE INVENTION

The present invention relates to a shock absorbing system for an automotive vehicle.

As a rule, the front and the rear bumpers of an automobile are securely connected to the front and rear ends of the body, i.e., they are integrated with the body. Under such circumstances if the automobile is involved in a collision with another automobile or other objects, a powerful shock force is transferred to the body along the bumper resulting in the shock being transferred to the car as well as the passengers in it, resulting in severe damage to or destruction of the automobile, as well as injury or death of the passengers.

SUMMARY OF THE INVENTION

The present invention provides a system in which the bumpers of a vehicle are not attached rigidly to the body but can be extended from the vehicle body and retracted towards the body, and wherein the extension or retraction of the bumpers is accomplished by hydraulic means which is activated by the application or release of the foot brake. In a shock absorbing mode the bumpers are extended from the automobile body by hydraulic means under pressure which is capable of absorbing a shock produced by a collision. In this way both the vehicle and its passengers are protected from the shock of a collision.

Thus, the present invention provides a shock absorbing system comprising a tank for storing hydraulic fluid, a gear pump driven by an electric motor, two oil filters, two one-way valves, a low hydraulic pressure alarm switch, a cross-connection, an accumulator, a pressure relief valve, a manual cut-off valve, a solenoid valve, a flow limiting valve and four actuators which are controlled by the solenoid valve; the front and rear bumpers being connected to retracting rods of the actuators. With this system, depression of the brake pedal activates the system to extend the front and rear bumpers outwardly controlled by the solenoid valve during a collision. The shock due to the collision is transferred to the actuators via the bumpers to cause hydraulic oil to flow back to absorb the shock by the accumulator, if oil pressure exceeds the set value of the hydraulic pressure of the system. The oil would then flow back to the tank and the shock force would be absorbed entirely to ensure the safety of passengers and the vehicle.

The present invention provides a shock absorbing system employing hydraulic pressure to transfer a shock force and to absorb the shock force by a gas. The system is constituted mainly by a tank, a gear pump, oil filters, a one-way valve, a low hydraulic pressure alarm switch, a cross-connection, an accumulator, a pressure relief valve, a manual shut-off valve, a solenoid valve, a flow limiting valve and an actuator.

The front and rear bumpers are not rigidly fixed to the automobile body. On depressing the brake pedal in the case of an emergency, the solenoid valve is controlled by a microswitch to drive the four actuators to extend the front and rear bumpers outwardly during a collision of the vehicle with another vehicle or object, the shock force being produced by the collision being transferred, via the bumpers, to the system and causing the hydraulic oil pressure to increase, this forcing the accumulators to retract to absorb the shock force on the one hand, and hydraulic fluid to flow back, via the pressure relief valve, into the tank due to a set value of the hydraulic oil pressure being exceeded, to absorb the shock force due to the collision entirely to reduce injury of passengers and damage to the car to a minimum.

BRIEF DESCRIPTION OF THE DRAWINGS

The drawings disclose an illustrative embodiment of the present invention, which serves to exemplify the various advantages and objects thereof, and are as follows:

FIGS. 6-1, 6-2 and 6-3 are diagrammatical drawings of a solenoid valve of the system of FIG. 1, illustrating its different settings;

DETAILED DESCRIPTION OF THE PREFERRED EMBODIMENT

Figure 1:
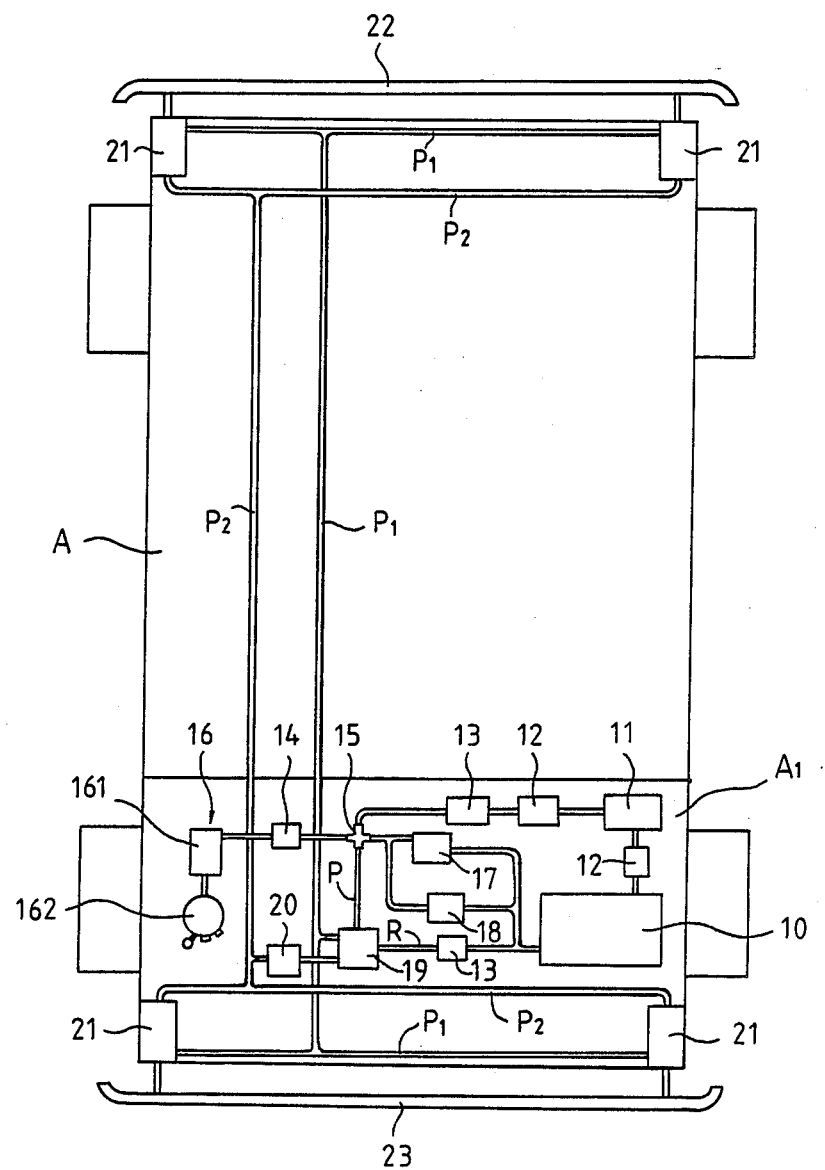
FIG. 1 is a diagrammatical illustration of the various parts of the system according to the invention installed on a vehicle body, which is shown in plan view.

In FIG. 1, there is shown an oil tank 10, a gear pump 11, a pair of oil filters 12, two one-way valves 13, a low hydraulic pressure alarm switch 14, a cross-connection 15, an accumulator 16, a pressure relief valve 17, a manual shut-off valve 18, a solenoid valve 19, a flow limiting valve 20, four actuators 21 and front and rear bumpers 22 and 23, respectively. The various parts as described above are connected together by pipes as shown. Except for the actuators 21 and the front and rear bumpers 22, 23, all the parts are installed in a trunk Al of the body A of the automobile. The various parts and their functions will now be described below:

The tank 10 is used to contain and store hydraulic fluid or oil (it is acceptable to use a mineral oil base) and it is connected to one of the oil filters 12, the pressure relief valve 17, the manual shut-off valve 18 and a one-way valve 13, respectively, as shown.

The pump 11 is a gear pump which is driven by an electric motor which is the basic power source of the system and it is used to draw hydraulic oil from the tank 10 to provide the pressure required by the system. The tank 10 and the pump 11 are connected to the two oil filters 12 by means of pipes, as shown.

The oil filters 12 are metal net oil filters to filter miscellaneous substances from the hydraulic oil to purify the oil and to increase the life expectancy of the system. The one filter 12 is connected between the tank 10 and the pump 11 and the other filter 12 is connected between the pump 11 and the valve 13.

Figure 2:
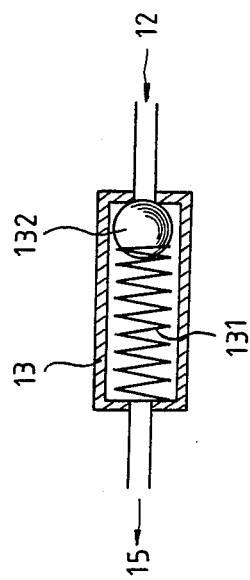
FIG. 2 is a sectional side view of a one-way valve of the system of FIG. 1.

More detail of the one-way valves 13 is shown in FIG. 2. As shown, a spring 131 and a ball 132 are provided to permit hydraulic oil flow from the ball 132 towards the spring 131 and not in the opposite direction The one valve 13 is connected between the oil filter 12 and the cross-connection 15. The other valve 13 is connected between the tank 10 and the solenoid valve 19 with pipes as shown.

Figure 3:
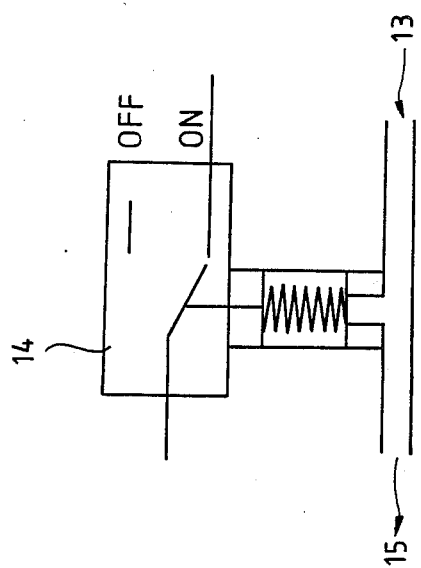
FIG. 3 is a diagrammatical drawing of a low hydraulic pressure alarm switch of the system of FIG. 1.

Detail of the low hydraulic pressure alarm switch 14 is shown in FIG. 3. The switch 14 controls the electric motor driving the pump 11. While the pressure of the system is below a predetermined maximum set valve, the switch 14 is switched to the ON position and the electric motor drives the pump 11. At the same time an alarm lamp, installed at the driver's seat of the vehicle, would light up, while the pressure is low to arouse the attention of the driver. Should the pressure of the system rise to exceed the set maximum value of the pressure, the switch 14 switches to the OFF position to stop the operation of the pump 11. The switch 14 is connected between the accumulator 16 and the cross-connection 15, therefore, it is immediately able to sense whether the pressure of the accumulator 16 is normal or not.

The cross-connection 15 is a shunt which is connected to the one one-way valve 13, the accumulator 16 (the low hydraulic pressure alarm switch 14 being located in-between), the pressure relief valve 17 and the solenoid valve 19 by means of pipes, as shown in FIG. 1.

Figure 4:
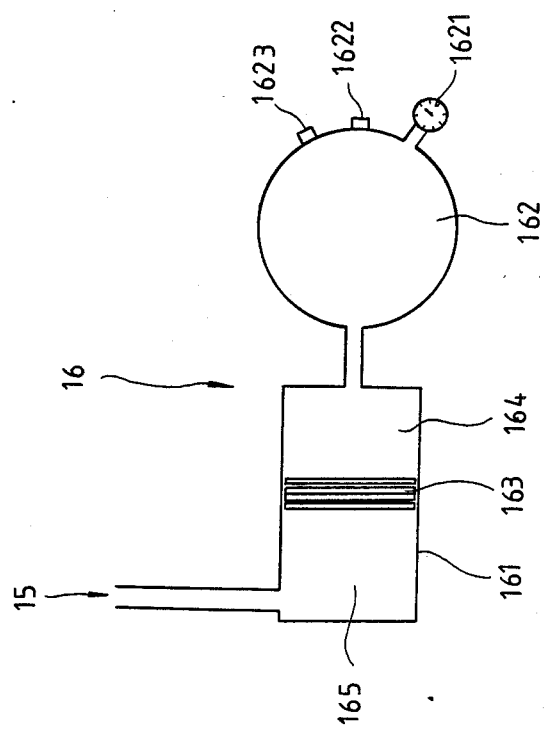
FIG. 4 is a diagrammatical drawing of an accumulator of the system of FIG. 1.

The accumulator 16 is shown in FIG. 4. It comprises a valve chamber 161, in which a piston 163 is provided, and a steel sphere 162. A plastic O-ring is provided in each of two grooves on the piston 163 to divide the valve chamber 161 into a gas chamber 164 and an oil chamber 165. The gas chamber 164 is connected to the sphere 162. A pressure gauge 1621, a gas inlet valve 1622 and a gas pressure relief valve 1623 are provided on the sphere 162. Dry nitrogen gas is introduced into the sphere 162 and the gas chamber 164, under a pressure which is slightly below the predetermined maximum pressure under which the system is set to operate. The oil chamber 165 is connected to the low hydraulic pressure alarm switch 14 by means of piping, the pressure of the hydraulic oil (i.e., the value of the pressure of the system) is usually a little higher than the pressure in the gas chamber 164 and the sphere 162.

Figure 5:
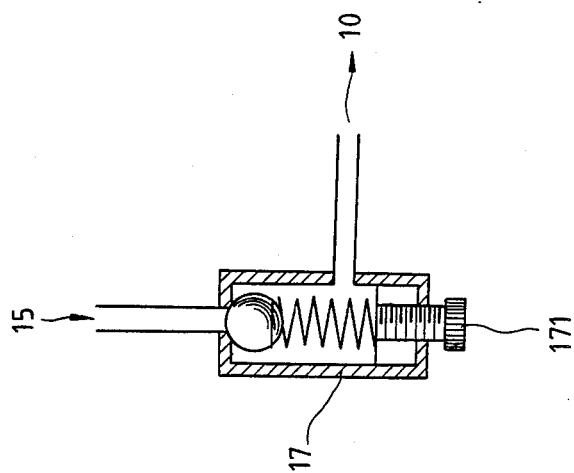
FIG. 5 is a sectional side view of a pressure relief valve of the system of FIG. 1.

As shown in FIG. 5, the pressure relief valve 17 is adjustable, i.e., the value of the pressure can be set to a desired level. This is achieved by means of a spring inside the valve body cooperating with a screw 171. The valve 17 is connected between the cross-connection 15 and the tank 10 by means of pipes, as shown. While the pressure of the system exceeds the set value, hydraulic oil will flow back to the tank 10 through this valve to maintain the pressure of the system.

The manual shut-off valve 18 is an ON/OFF valve which is connected to the tank 10, the cross-connection 15 and the pressure relief valve 17. When pressure in the system is not required during times of maintenance or service, it can be opened to allow oil to flow back into the tank 10 and to reduce the pressure in the system to zero.

Figures 3, 6:
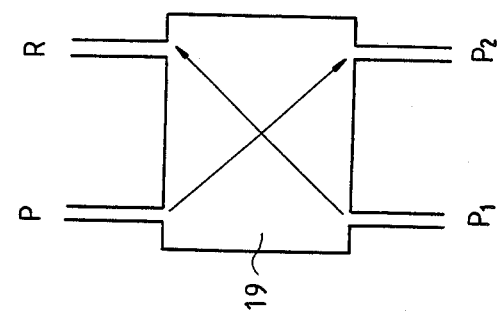
Figures 2, 6:
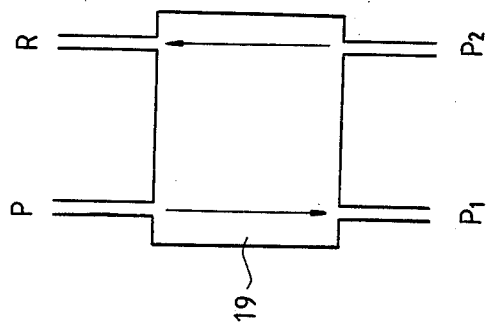
Figures 1, 6:
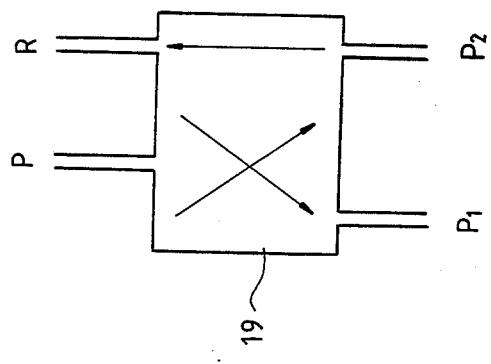

Details of the solenoid valve 19 are shown in FIGS. 6-1 to 6-3. It is controlled by a microswitch which is installed to be activated by the brake pedal of the vehicle. The microswitch controls, via the power supply from the battery through a fuse, the ON/OFF switch and the microswitch. As shown in FIG. 6-1, the valve 19 is connected to various members by means of four pipes, in which the pipe P is connected to the cross connection 15 (i.e., the piping which is connected to the pump 11). The valve 19 is connected to the tank 10 by means of the pipe R with a one-way valve 13 in-between. The valve 19 is connected to the piping of upper oil chambers of the actuators 21 with piping P1 and it is connected to the piping of lower oil chambers of the actuators 21, via the flow limiting valve 20, with piping P2. Under normal running of the vehicle (without depressing the brake pedal), the arrangement is like that shown in FIG. 6-2, the pipe P is connected to the upper oil chambers of the actuators 21 via piping P1. The piping P2 of the lower oil chambers of the actuators 21 is connected to piping R to return the oil flowing back to the tank 10 via the one one-way valve 13. This one-way valve 13 allows the flow of oil from the solenoid valve 19 in the direction of the tank 10 only. On depressing the brake pedal, the passage in the solenoid valve 19 is changed to that shown in FIG. 6-3, the pipe P is now connected to the lower oil chambers of the actuators 21 via piping P2 and the upper oil chambers of the actuators 21 are connected to the tank 10 via piping R by piping P1. The action of the four actuators 21 is controlled appropriately to control the extension and retraction of the front and rear bumpers 22, 23.

Figure 7:
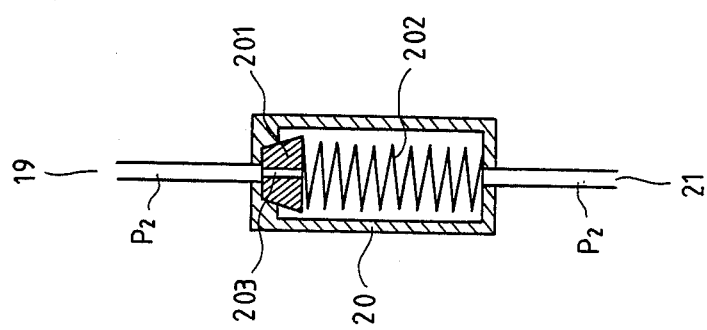
FIG. 7 is a sectional side view of a flow limiting valve of the system of FIG. 1.

As shown in FIG. 7, the flow limiting valve 20 comprises a cone-shaped valve 201 and a spring 202. A passage 203 is provided through the middle of the cone valve 201. The valve 20 is connected between the piping P2 of the lower oil chambers of the actuators 21 and the solenoid valve 19, respectively. The arrangement is that, on depressing the brake pedal, the oil pressure from the solenoid valve 19 is connected to the piping of the lower oil chambers of the actuators 21. Once the front or rear bumper 22, 23 collides with another vehicle or object, the pressure borne by the actuators 21 is led back, via the piping P2 of the lower oil chambers, and the amount of oil which flows back is restricted by the passage 203 in the cone valve 201 to protect the accumulator 16.

Figure 8:
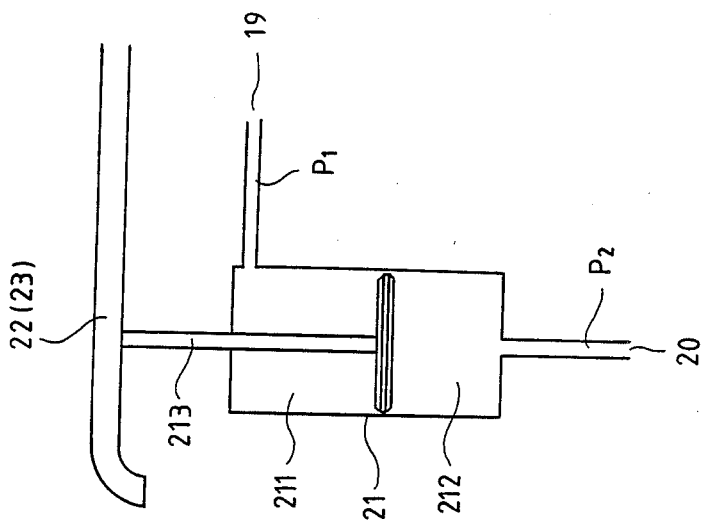
FIG. 8 is a diagrammatical drawing of an actuator of the system of FIG. 1.

As shown in FIG. 1, there are four actuators 21, which are installed at the two corners of the front and rear of the chassis of the vehicle body A. The one side of the actuator 21 is connected to a bumper through rod 213 and the other side of the actuator is connected to the vehicle chassis body. As shown in FIG. 8, the interior of an actuator 21 is divided into an upper oil chamber 211 and a lower oil chamber 212 and there is a retracting rod 213 in the upper oil chamber. The upper oil chamber 211 is connected to the piping P1 and the lower oil chamber 212 is connected to the piping P2 to be controlled by the solenoid valve 19 to control the extension and retraction of the rod 213.

The front and rear bumpers 22, 23, are connected to the ends of the retracting rods 213 of the actuators 21 on the front and rear of the vehicle body, respectively. They can be extended from or retracted towards the body A, depending on the position of the retracting rods 213.

The system operates as follows:

When the system is switched on, the low hydraulic pressure alarm switch 14 is activated. While the pressure of the system is lower than the set value, the switch 14 is in the ON position and the electric motor of the pump 11 is activated to operate the pump 11 drawing oil via the oil filter 12 out of the tank 10 to increase the pressure in the system. The alarm lamp lights up simultaneously to advise the driver that the pressure of the system is low at this time. When the pressure reaches the set value, the low hydraulic pressure alarm switch 14 switches to the OFF position immediately to stop the operation of the pump 11 and the pressure of the system is maintained at the set value. The alarm lamp goes off immediately to advise the driver that the system has returned to the normal state of operation. There is thus another condition in that, while the system is switched on, the alarm lamp does not light up, it means that the value of the pressure of the system is being maintained at the set value of the pressure.

On running the vehicle (without depressing the brake pedal), the pump 11 draws hydraulic oil from the tank 10 and the oil flows, via the oil filters 12, the one-way valve 13 and the cross-connection 15 into the oil chamber 165 of the accumulator 16. It also flows to the pressure relief valve 17 but owing to the pressure in the system being within the set value of the pressure, the pressure relief valve 17 remains inactive and in a closed state. The oil also flows to the solenoid valve 19, the flow limiting valve 20 and the piping P1 to produce pressure to maintain the four rods 213 of the actuators 21 in a retracted state and thus to maintain the front and the rear bumpers 22, 23 against the body A and the oil in the lower oil chambers 212 of the actuators 21 flows back into the tank 10 via the piping P2, the flow limiting valve 20, the piping R of the solenoid valve 19 and the one-way valve 13, respectively.

When applying brakes in an emergency, the microswitch is switched on immediately to activate the solenoid valve 19 to change its condition from that shown in FIG. 6-2 to that shown in FIG. 6-3. Thus, the hydraulic oil pressure from piping P (i.e., via the pump 11, the oil filters 12 and the one-way valve 13) is connected to piping P2 via the flow limiting valve 20 to transfer the pressure to the lower oil chambers 212 of each of the four actuators 21 to push the four retracting rods 213 to extend outward simultaneously resulting in the front and rear bumpers 22, 23 to be extended outwardly, respectively. By this time, the oil in the upper oil chambers 211, via P1 and solenoid valve 19 flows back into the tank 10 via piping R.

On account of the front and rear pumpers 22, 23 having already been extended from the front and the rear of the vehicle body, it is the bumpers which contact the other vehicle or object during a collision and which bear the shock. The shocking force is transferred to the actuators 21 through the retracting rods 213 of the actuators 21 which are pushed inwardly resulting in pressure being transferred from the lower oil chambers 212 to the flow limiting valve 20, via pipe P2, to cause the oil in the valve to flow back in a limited amount (i.e., limited pressure and quantity). The pressure is transferred to the accumulator 16 via the passage 203, the one-way valve 13, and the pressure relief valve via the solenoid valve 19. On account of the one-way valve 13 not allowing reverse flow and the manual shut-off valve 18 being in a closed state, the pressure is transferred to the accumulator 16 and the pressure relief valve 17 only. The pressure transferred to the oil chamber 165 of the accumulator 16, at first, owing to the pressure relief valve 17 holding the set value of pressure, causes the gas chamber 164 and sphere 162 to be compressed and thus absorb the shocking force produced by the collision. In addition, once the pressure increase resulting from a collision exceeds the set value of the system, the hydraulic fluid flows back into the tank 10 via the pressure relief valve 17 until the pressure increase due to the collision is absorbed entirely, and then the system returns to its original state.

As already stated herein, the system according to the present invention is able to absorb a large amount of the powerful shocking force produced by the collision of a vehicle due to the action of the accumulator 16 and the pressure relief valve 17, and on account of the fact that it is the front and the rear bumpers 22, 23 which make contact during a collision, the body of the vehicle and the passengers therein are affected only slightly, as well as the car itself, so that the safety of the car and its passengers is protected.

The material of the front and rear bumpers 22, 23 should be of a high strength, because of the fact that the chassis is the most rigid and strongest member of the vehicle and the four actuators 21 are installed at the four corners of the chassis, it should be sufficient to bear a powerful shocking force to cause it to be absorbed by the accumulator 16 and the pressure relief valve 17. Besides, the reason that the shocking force is conveyed to the lower oil chambers 212 by the actuator rods 213 and led back to the solenoid valve 19 via piping P2 and via the flow limiting valve 20, is to utilize the action of a limited oil quantity and pressure due to the flow limiting valve 20 to prevent a large surge pressure to be transferred to the accumulator 16 resulting in the explosion of the accumulator 16. Thereby the accumulator 16 is protected. Therefore, other than ensuring the safety of the passengers and the vehicle, the system itself also provides safety device, the design of which is practical.

As indicated, the structure herein may be variously embodied. Recognizing various modifications will be apparent, the scope hereof shall be deemed to be defined by the claims as set forth below.

I claim:

1. A shock absorbing system for an automotive vehicle having a chassis and front and rear bumpers which are movable relative to the chassis, which system comprises an hydraulic fluid or oil circuit which includes a storage tank for storing hydraulic oil;

a pump for pumping hydraulic oil from the tank into the circuit;

an electric motor for driving the pump;

an actuator in the circuit downstream of the pump for extending or retracting the front and rear bumpers away or toward the chassis and comprising an upper oil chamber and a lower oil chamber and means for maintaining the bumpers in a retracted position relative to the chassis when a predetermined oil pressure is maintained in the upper oil chamber and means for moving the bumpers to position in which they are extended from the chassis when the predetermined pressure is maintained in the lower oil chamber;

a solenoid valve for alternately connecting either the upper oil chamber or the lower oil chamber of the actuator to the hydraulic oil flow line downstream of the pump to maintain the said predetermined oil pressure in either the upper oil chamber or the lower oil chamber;

switching means for activating the solenoid valve;

the hydraulic oil circuit including an hydraulic oil return line extending from the actuator to the storage tank; and an accumulator for absorbing a pressure shock imparted to the front or rear bumper due to a collision of the vehicle with another vehicle or object, which accumulator comprises a cylinder and a piston in the cylinder dividing the cylinder in an oil chamber, which is connected to the hydraulic oil return line, and a gas chamber which is connected to a source of pressurized gas.

2. The shock absorbing system according to claim 1, including a flow limiting valve in the hydraulic oil return line upstream of the accumulator which includes means for limiting the amount of hydraulic oil flowing to the accumulator to protect the accumulator from excessive oil pressure.

3. The shock absorbing system according to claim 2, including a pressure relief valve in the hydraulic oil return line which opens when the hydraulic oil pressure exceeds the predetermined value for returning hydraulic oil from the actuator to the storage tank.

4. The shock absorbing system according to claim 3, wherein the hydraulic oil return line comprises a first return line, which includes the flow relief valve, and a second return line in parallel to the first return line, which includes a one-way valve.

5. The shock absorbing system according to claim 1, wherein the switching means for activating the solenoid valve comprises a microswitch which is associated with a footbrake pedal of the vehicle to activate the microswitch when the brake pedal is depressed.

6. The shock absorbing system according to claim 1, wherein the actuator comprises a cylinder and a piston in the cylinder dividing the cylinder into the upper and the lower oil chambers and wherein the piston is provided with a rod to which the bumper is attached.

7. The shock absorbing system according to claim 1, wherein four actuators are provided, two for location at the front of the chassis for extension and retraction of the front bumper and two for location at the rear of the chassis for extension or retraction of the rear bumper.

8. The shock absorbing system according to claim 1, including a low pressure alarm switch for sensing the oil pressure in the hydraulic oil circuit and including means for switching on the motor driving the pump when the pressure is below the predetermined value and to switch off the motor when the pressure reaches the predetermined value.

9. The shock absorbing system according to claim 1, including a manual shut-off valve for releasing pressure of the system during maintenance or servicing.

* * * * *